Aug. 13, 1957  J. L. MURRAY  2,802,694
RETRACTIBLE VEHICLE TOP WITH ACTUATOR RESPONSIVE
TO RAIN SWITCH
Filed Jan. 24, 1949  6 Sheets-Sheet 1

INVENTOR
JEROME L. MURRAY
BY Bartlett, Eyre, Keel
and Weymouth
ATTORNEYS

Aug. 13, 1957 J. L. MURRAY 2,802,694
RETRACTIBLE VEHICLE TOP WITH ACTUATOR RESPONSIVE
TO RAIN SWITCH
Filed Jan. 24, 1949 6 Sheets-Sheet 4

INVENTOR
JEROME L. MURRAY
BY
*Bartlett, Eyre, Keel & Weymouth*
ATTORNEYS

Aug. 13, 1957 J. L. MURRAY 2,802,694
RETRACTIBLE VEHICLE TOP WITH ACTUATOR RESPONSIVE
TO RAIN SWITCH
Filed Jan. 24, 1949 6 Sheets-Sheet 5

INVENTOR
JEROME L. MURRAY
BY
Bartlett, Eyre, Keel & Weymouth
ATTORNEYS

United States Patent Office 2,802,694
Patented Aug. 13, 1957

2,802,694

RETRACTIBLE VEHICLE TOP WITH ACTUATOR RESPONSIVE TO RAIN SWITCH

Jerome L. Murray, Stamford, Conn., assignor to Pollard & Johnston, New York, N. Y.

Application January 24, 1949, Serial No. 72,286

3 Claims. (Cl. 296—117)

This invention relates to automobiles and the control and operation of the tops and windows thereof although certain features of the invention have other applications.

One object of the invention is a means for raising the top responsively to the beginning of a shower.

A further object of the invention is a means for raising the top and closing the windows of an automobile responsively to the beginning of a shower.

A further object is a means for raising the top and closing the windows responsively to snow and sleet.

A further object of the invention is a novel and improved means for the control and operation of the top and windows of an automobile.

A further object of the invention is a novel and improved precipitation control and circuit.

Further objects of the invention are a novel and improved rain control switch and circuit which is characterized by its low cost and its marked sensitivity, novel and improved means for correlating and timing the operation of the top and windows of a car and novel and improved correlated top cover means and power operating means therefor.

A further object of the invention is a novel and improved control unit.

A further object of the invention is a novel and improved top and cover fastening means and top operating means correlated therewith.

Further objects of the invention will hereinafter appear.

For a better understanding of the invention reference may be had to the accompanying drawings forming a part of this application, wherein

Fig. 20 is another embodiment of a control circuit for the motor control circuit.

The owner of a sport or other automobile having a lowerable top often finds the upholstery of the car drenched by a rain storm in his absence and in addition to the inconvenience of using a car while the upholstery and other internal furnishings are wet, the drenching is injurious thereto. By the use of my invention the owner of a car may safely park it with the top down and leave it for indefinite periods with the assurance that the top will be raised responsively to the beginning of a shower with complete protection to the upholstery and furnishings against rain damage due to a lowered top. To this end my invention in one aspect resides in the provision of control and operating means sensitive to the initial fall of rain to raise the top with the same certainty as if the owner were present and manually raising it.

In another aspect the invention resides in a control and operating means of the character indicated which upon being set for operation by the owner of the car when he leaves it parked with the top and windows down, functions promptly in response to the beginning of a shower or rain storm both to raise the top and close the windows.

In addition to these general aspects of the invention, there are other novel features contributing to the safety and certainty of the operation of both the top and the windows responsively to the falling of the first rain drop or the first few rain drops at the beginning of a shower or rain storm and to low cost of manufacture and installation of the system. In the drawings and in the following specification I have illustrated my invention as applied to a sport passenger car of a well-known make but it is understood that my invention is applicable to and useful on other makes and designs of cars.

Figure 1:
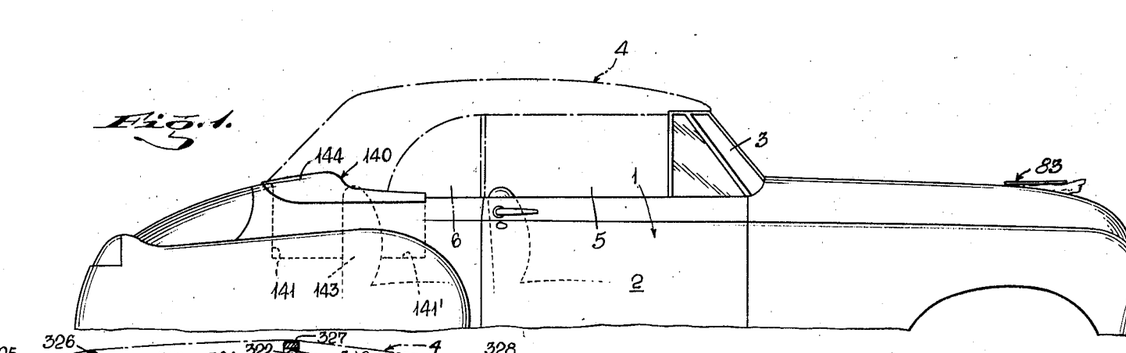
Fig. 1 is a schematic view of the body of an automobile embodying the invention.
Figures 1A, 1B:
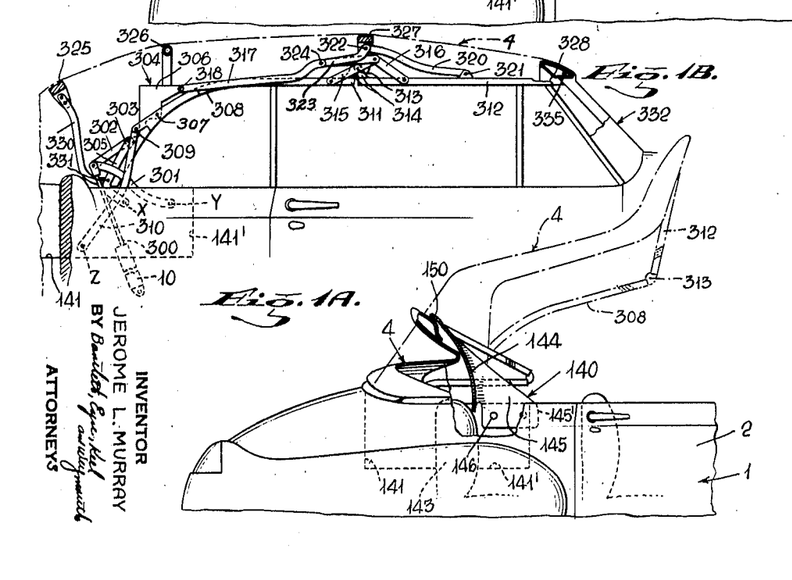
Fig. 1A illustrates steps in the raising of the top.
Fig. 1B is a schematic view showing the top frame and operating means therefor.

Referring to the drawings, and particularly to Figs. 1 and 1A, I have illustrated my invention as embodied in an automobile having a main body 1, a door 2 on either side, a wind shield 3 and a top 4 shown in three positions during the raising operation. The full line position (Fig. 1A) indicates the position of the top soon after the beginning of the raising operation and the dot-dash position shows an intermediate position. There are two windows on each side indicated respectively at 5 and 6. Each of the four windows and the top may be operated individually and separately by the car operator. In the embodiment of the invention herein illustrated and described more particularly below, the top is automatically raised and the windows automatically closed responsively to the falling of the first rain drops.

Any suitable power mechanism may be provided for operating the top and the windows. In the particular embodiment shown in the drawings, the power mechainsm for raising and lowering the top includes a pair of hydraulic cylinders 10 which are schematically illustrated. These cylinders 10 are supplied with fluid pressure from a motor pump assembly comprising a pump 11, an electric motor 12 and a reservoir 13. The fluid pressure connecting lines between the cylinders 10 on the one hand and the pump 11 on the other, are indicated at 14 and 15, the line 14 being the pressure line when the top is being raised and the line 15 being the pressure line when the top is being lowered. While one line is being used as a pressure line the other line is being used as an exhaust line, the line 15 being connected to the upper ends of the cylinders 10 and the line 14 being connected with the lower ends of the cylinders. The fluid lines leading to and from the cylinders 10 are controlled by two pairs of solenoid or electrically operated valves 16, 17, 18 and 19. When the valves 16 and 18 are open fluid pressure may be supplied from the pump through the supply line 20 through the valve 18 and thence to the pressure line 14 to operate the pistons of the cylinders 10 to raise the top while the exhaust line 15 is connected with the return line 21 through the valve 16. When the top is to be lowered, the valves 16 and 18 are maintained closed while the valves 17 and 19 are open whereupon the line 15 becomes the pressure line and the line 14 becomes the exhaust line with the fluid pressure flowing through the valve 17 and the exhaust fluid flowing through the valve 19 through the pipe connection 22 as a return line.

The solenoids of the electrically operated valves 16, 17, 18 and 19 are controlled by a three-position double contact push button switch element 24 which controls the electric circuits 25 and 26 leading through the solenoids to the ground, the circuit 25 leading to the solenoids of valves 16 and 18 and the circuit 26 leading to the solenoids of valves 17 and 19. The ground connection with the solenoids is indicated at the line 27. Any suitable source of electric energy may be employed for energizing the solenoids and I have schematically illustrated a conventional battery at 28, one side being grounded and the other or positive side being connected through the line 29 which leads to a line 30 connected with the three-position switch element 24'. The three-position switch element 24' controls a contact 31 leading through the line 25 to the solenoids 16 and 18 when the up button is pressed downward, and controls the solenoids of the valves 17 and 19 through a contact 32 electrically connected with the line 26 when the down button is pressed to close the circuit at the contact 32. Simultaneously with the closing of the circuits of either pair of solenoids the electric motor 12 which drives the pump 11 is energized by a pair of contacts 33 connected with a line conductor 34 which leads to and energizes the coil of an electromagnet 35 which actuates an armature 36 to close the motor circuit at the contact 17a. It is understood that when the solenoid 35 is energized that it draws the armature 36 up to close the contact 17a and maintains the circuit of the motor closed as long as either the up or the down button is pressed down to control the pairs of solenoids 16, 18 and 17, 19.

Any suitable mechanism may be employed for operating the windows and in the particular embodiment shown I have illustrated a conventional arrangement wherein the rear windows 6 are biased to open position by springs 37 and are operated to the closed position by hydraulic cylinders 38. These cylinders are energized by fluid pressure supplied to a line 39 which in turn is in communication with a fluid supply line 40 leading to the pressure side of the pump 11. The operating mechanisms between the cylinders 38 and the windows 6 are of a suitable type comprising a pair of upwardly extending arms or links 41 and 42 pivotally mounted at their lower ends to a fixed part of the frame and pivotally fastened at their upper ends to a pair of links 43 and 44 which in turn are pivoted to each other at 45, the link 43 being connected to one end of the spring 37 while the link 44 is connected to the piston of the cylinder 38. A rear window 6 is suitably fastened to the links 43 and 44 so as to be operated in the one case by the spring 37 and the other by the cylinder 38 against tension of the spring 37 as, for example, by means of an attaching link 46 pivotally fastened at 45 to the links 43 and 44.

The front windows 5 may be operated by any suitable power mechanism and I have illustrated a conventional arrangement wherein each mechanism comprises a pair of springs 47 for opening the windows and a hydraulic cylinder 48 for closing the window against the tension of the biasing springs 47. The connecting means between the springs and the cylinder 48 with the windows 5 comprises a pair of upwardly extending pivot arms or links 49 pivotally fastened to a fixed part of the framework at their lower ends. These arms or links 49 are pivotally fastened respectively at their upper ends to the ends of operating links 50 and 51. The latter are pivotally fastened to each other at 52 and any suitable operating connections may be provided between the links 50, 51 and the front window as, for example, by suitably attaching the window to the free ends 51' and 52' in accordance with a conventional arrangement.

The particular power mechanisms for operating the windows 5 and 6 are as indicated suitable and are purposely schematically illustrated with the details of structure and the operating connections being omitted for convenience in illustration.

The cylinders 48 are energized by fluid pressure supplied from the line 40 through a line 39', similarly to the supply of fluid through the line 39 to the cylinders 38.

Figures 3, 4, 4B, 4C, 4D, 8, 12:
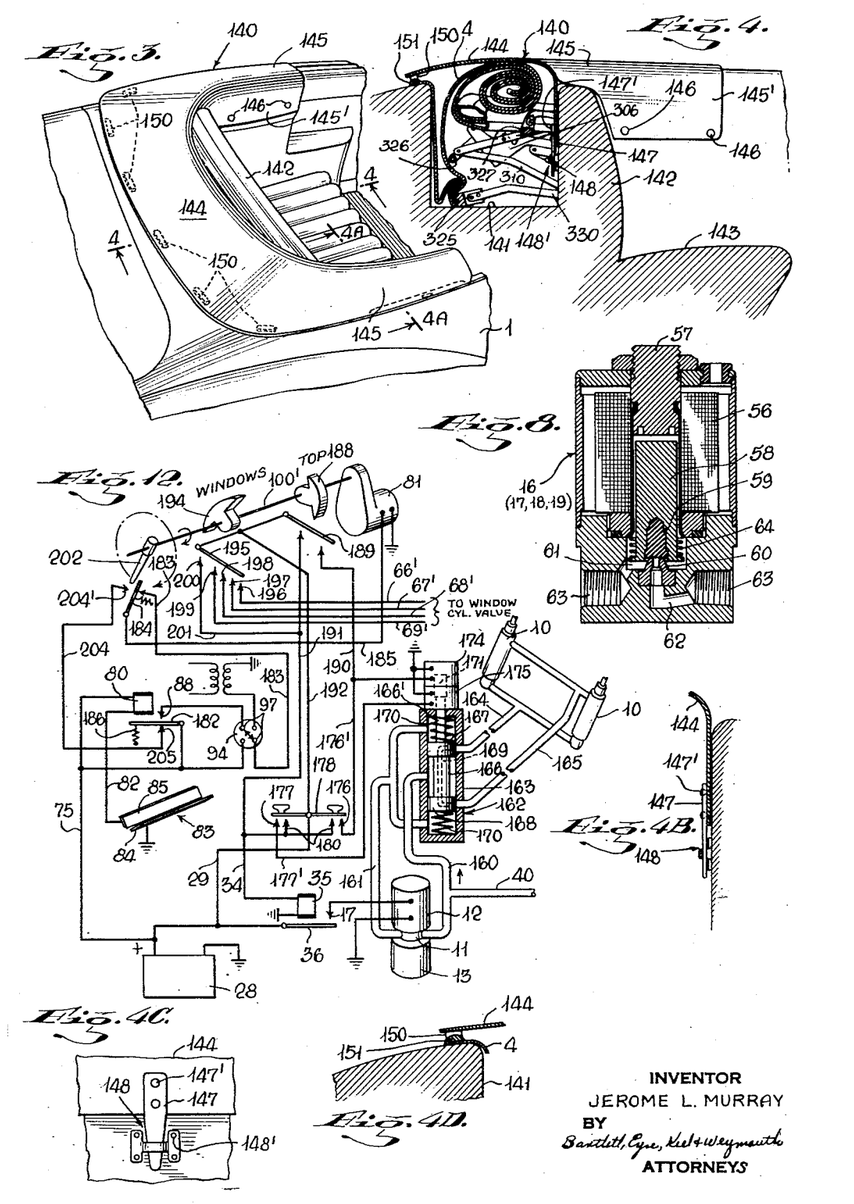
Fig. 3 is a perspective view of a portion of the body showing the top in lowered position.
Fig. 4 is a sectional view along the line 4—4 of Fig. 3 with certain parts omitted for convenience in illustration.
Fig. 4B is an enlarged view of a portion of Fig. 4.
Fig. 4C is a front view of a portion of Fig. 4B.
Fig. 4D is an enlarged view of a portion of Fig. 4.
Figs. 8 and 8A are schematic sectional views of electromagnetically operated valves which may be used in the invention.
Fig. 12 is a schematic illustration and diagram of another embodiment of the invention.
Figure 4A:
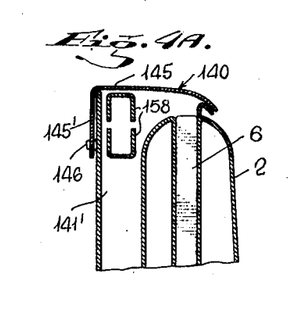
Fig. 4A is a sectional view along the line 4A—4A of Fig. 3 with certain parts omitted for convenience in illustration.

The electrically operated valves 16, 17, 18 and 19 may be identical and of any suitable construction such, for example, as that shown in Fig. 8. The solenoid of this valve is indicated at 56 and it is provided with an adjustable fixed core or armature part 57 and a movable core part 58. The movable part 58 is provided with a valve insert 59 which cooperates with a valve seat 60 and the valve insert 59 is adapted to open and close communication between a chamber 61 disposed about the valve seat and a chamber 62 formed in the valve structure. Threaded openings 63 are provided for the attachment of pipes 63'. The valve 59 is normally biased to closed position by a spring 64 surrounding the movable core or armature part 58 at its lower end and engaging a fixed part of the structure at one end and an annular flange on the movable part 58 at its lower end. The energization of the solenoid 56 operates the movable core or armature part 58 against the tension of the spring 64 to establish communication between the pipes 63'.

Figures 8A, 9:
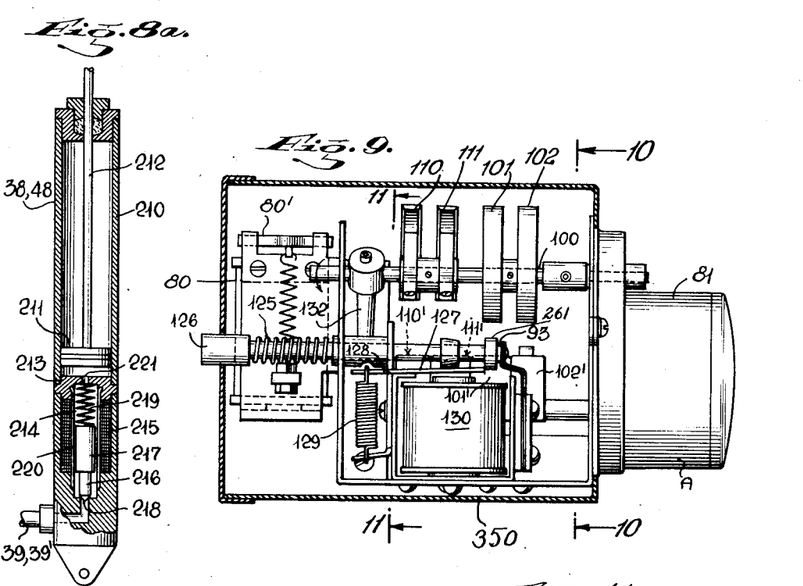
Fig. 9 is a sectional view along the line 9—9 of Fig. 10.

The cylinders 38 and 48 and the valve controls therefor may be of any suitable construction and type and I have shown schematically in Fig. 8A one such structure. The cylinder and valve constitutes a unitary structure comprising an elongated cylinder 210, a piston 211 and piston rod 212 for attachment to the window mechanism. The cylinder 210 is provided with a disk 213 forming a chamber 214 below the piston chamber containing a valve operating solenoid 215. The movable valve element is indicated at 216 which is carried by a core armature 217, the valve being biased to its seat 218 by a coiled spring 219 engaging at its lower end the core 217 and the disk 213 at its upper end. A fluid passage 220 may be provided between the valve seat 218 and the chamber below the piston and through an opening 221 in the disk 213. The pipes leading to the valve seat 218 are indicated at 39, 39'.

At 65 I have illustrated a suitable manual control for individually lifting or lowering the windows, this control being mounted in any convenient part of the car, as for example, on the control panel or on one of the side doors. This control comprises a separate and individual means for controlling the valve of each cylinder and for energizing the pump motor 12, only the valve being opened when it is desired to lower the window through the operation of the biasing spring or springs but energizing both the solenoid of the valve and the motor 12 when it is desired to lift or close the window or windows. For this purpose there are illustrated four switch control elements 66, 67, 68 and 69. These manually operated switch elements are pivotally mounted for up and down movements and whether moved up or down energize the lines 66', 67', 68' and 69' leading to the solenoids of the valves (Fig. 8A), the movable switch elements 66, 67, 68 and 69 cooperating respectively with pairs of contacts 70, 71, 72 and 73. The switch elements themselves are electrically connected with a line conductor 75 leading to the positive side of the source of electrical energy 28 through the conductor 29.

When the switch elements 66–69 are moved upwardly they not only energize the solenoids of the valves but they also energize the solenoid 35 which closes the motor 12 circuit at 17a, thereby starting the pump 11 for the supply of fluid pressure to the cylinder or cylinders 38 and 48 for the purpose of lifting the window or windows. This energization of the solenoid 35 is effected through the medium of contacts 76 which are closed by the switch elements 66 to 69 to energize the line 77 which is connected with the line 34 at 78. Thus when it is desired to lift or close a window it is only necessary to lift up the corresponding manual control switch element 66, 67, 68 and 69 and when it is desired to lower a window which is closed or partially closed, it is only necessary to operate the corresponding switch element in a downward direction. When a switch element is in the neutral position, namely not engaging either of the contacts the window remains in the position it was at the time the switch element is moved to the neutral position, the valve (Fig. 8A) being closed and maintaining the window in the desired position through retention of fluid trapped in the cylinder by the closure of the valve.

Figures 2, 2A:
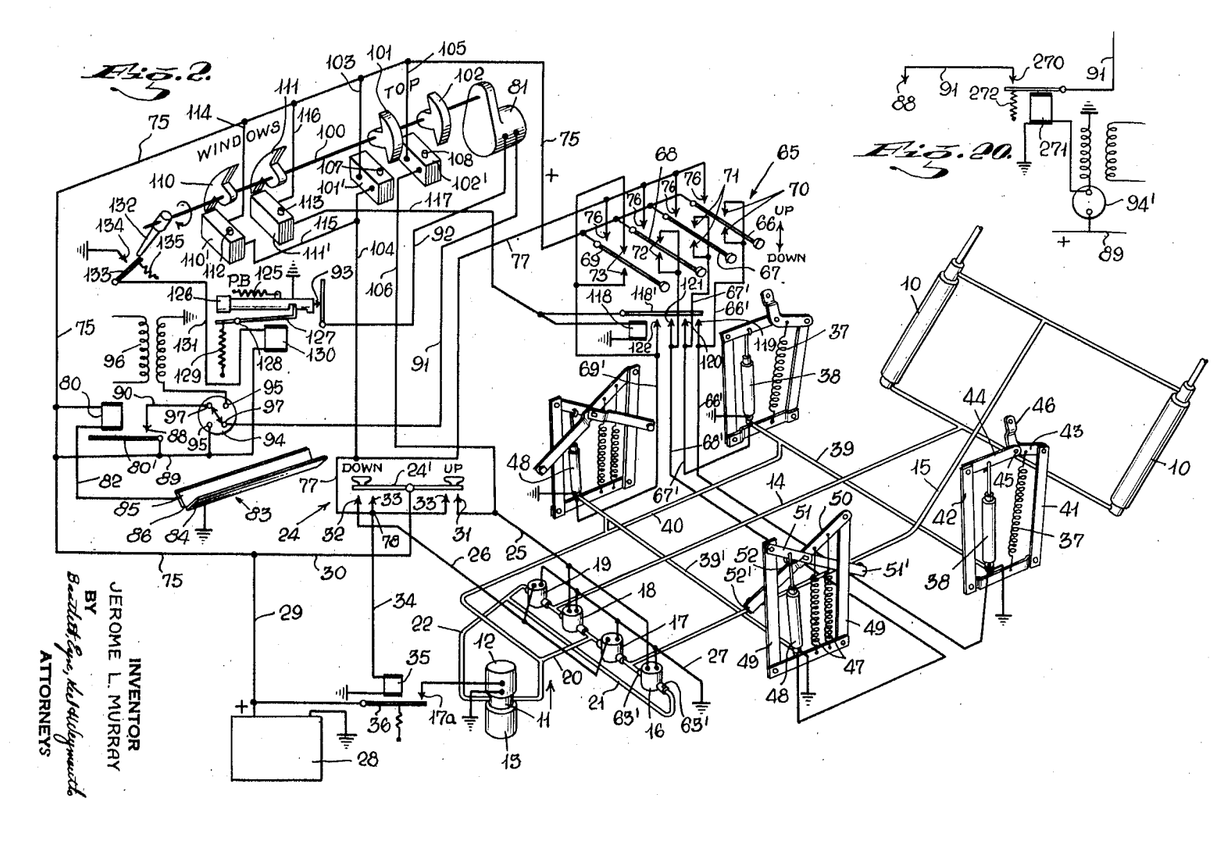
Fig. 2 is a schematic illustration and diagram of one embodiment of the invention.

I have also illustrated schematically in Fig. 2 the important features of my invention embodying the control means which, responsively to the falling of the first rain drop or the first few rain drops, causes the operation of the power devices to raise the top and close the windows. This control means comprises a sensitive relay 80 energized by the first rain drop or the first few rain drops to control the circuit of an electric motor 81 which in turn controls the circuit of the electric motor 12 for driving the pump 11 and the several control means for effecting the raising of the top and the closing of the windows.

The circuit of the sensitive relay 80 is from the positive side 75 of the source of electricity through an electrical conductor 82 and through a rain drop control device 83 to ground. The latter is in the form of a pair of narrow elongated plates 84 and 85, the latter being electrically connected with the conductor 82 and insulated in any suitable manner from the frame of the car and the former being electrically connected with the car frame or ground. These two narrow elongated metallic plates may be of any suitable metal as, for example, the non-corrosive chrome metal and are arranged in the form of a miniature trough having a slot or spacing 86 at the bottom between the plates 84 and 85.

The spacing 86 is preferably sufficiently small for a rain drop (a in Fig. 7A) to bridge the two plates and to thereby control the circuit of the sensitive relay 80. For this purpose the spacing should be at least slightly less than the diameter of the drain drop as it falls upon the lower edges of the plates 84 and 85. With this particular structure it bridges and completes the circuit at the plates whether the drop or drops remain in contact with the upper surfaces of the plates or pass down into the gap 86 between their edges. With any given sensitive relay 80 the detector circuit is more sensitive with the smaller spacings 86. For example, with a relay of a certain sensitivity I have been able to obtain the energization of the relay sufficiently to close the relay circuit with a spacing 86 approximating forty thousandths of an inch with one or two drops of water but with greater spacings as, for example, up to eighty thousandths of an inch I was unable to energize the particular sensitive relay with a single drop of water. However, with a sufficiently sensitive relay 80 sufficient current may be obtained to operate the relay with a single drop of water and with spacings of eighty thousandths inch or even greater. From the point of view of sensitivity of the rain detector switch I have found that spacings from forty thousandths to one hundred and twenty-five thousandths inch are desirable, although certain features and advantages of the invention are present without regard to any particular spacing as, for example, the open ended gap 86 construction and the mounting of the rain detector switch on an automobile or other vehicle in a manner to cause the air flow to sweep the switch clean of water after the rain stops and the car is moving.

Figure 7:
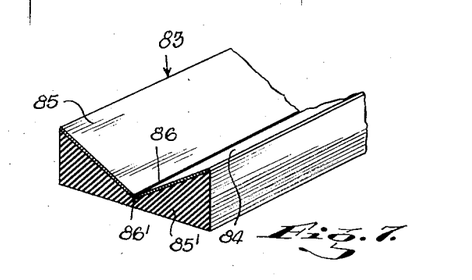
Fig. 7 is a perspective view of a rain control switch embodying the invention.

In the particular embodiment shown (Figs. 1 and 7) the rain detector 83 is mounted on an insulating block 85' as, for example, a block of an insulating plastic material and this block 85' is provided with an upper surface of trough-like form to receive the elongated narrow plates 84 and 85 with the lower edges of the plates 84 and 85 spaced at 86 to form the gap in the relay circuit and with the lowest part 86' of the insulating block 85' forming the bottom of the slot or gap 86 thus provided.

Another important feature of the invention is the manner of mounting the rain detector 83 on the car or automobile. It is mounted on the car so as to extend longitudinally thereof whereby with the travel of the car the sweep of the air longitudinally of the detector 83 sweeps the rain drops from the slot 86, with the accompanying advantages described more specifically below. In the particular embodiment this rain detector is mounted at the front and center of the hood and forms a part of the ornament therefor. The arrangement is such as indicated above that upon the fall of the first few rain drops at the beginning of a rain storm or shower the rain detector circuit is closed at the gap 86 by one or more rain drops either falling directly on the slot or gap 86 or by falling on the inclined elongated plates 84 and 85, whereupon they run by gravity to the slot or gap 86 to close the circuit.

Upon the closure of the rain detector circuit the sensitive relay 80 operates its armature 80' to close a circuit at contact 88 from a conductor 89 which is connected with the positive side 75 of the source of energy. From the contact 88 a circuit leads to a conductor 91 connected with one side of the control motor 81 and the circuit from the motor is completed through a conductor 92 leading to the ground through a switch 93. Another important feature of the invention is that the rain control of the raising of the top and the closing of the windows of the car is dependent upon the car motor or engine being at rest as, for example, by providing a multi-position ignition switch 94 which in one position connects the pair of contacts 95 to close the circuit to the ignition coils 96 and in the other position bridges the contacts 97 to close the circuit 90, 91 of the control motor 81. Thus when the ignition circuit is closed the circuit of the control motor 81 is interrupted at the ignition switch and the power means for operating the top and the windows is solely under the manual controls above described.

Other important features of the control reside in the manual control of the circuit of the control motor 81, the sequential raising of the top and the closure of the windows and the arrest of the motor 81 at a predetermined position after the top has been raised and the windows closed responsively to the rain control, ready for another cycle of operation. The electric motor 81 is suitably geared down to a shaft 100 which has mounted thereon a pair of arcuate switch actuating elements 101 and 102, these switch elements having in the particular embodiment shown equal arcuate lengths and both of them operating not only in unison but in phase. The arcuate switch element 101 controls a micro switch 101' and the switch element 102 controls a micro switch element 102'. These micro switch elements are schematically illustrated in Fig. 2 and when actuated by the actuating arcuate elements 101 and 102 function to control respectively the circuits 103, 104 and 105, 106. The portions 103 and 105 of these circuits are connected with the positive side 75 of the source of energy while the portions 104 and 106 lead respectively to the control line 34 controlling the motor circuit relay 35 and the circuit 25 controlling the electromagnetically operated valves 16 and 18. The actuated parts of the micro switches 101' and 102' are indicated schematically respectively at 107 and 108 and so long as the arcuate actuating elements 101 and 102 are in engagement therewith the circuits to the relay 35 and the solenoids of the electromagnetically operated valves 16 and 18 are energized to cause the operation of the hydraulic pump motor 12 and to hold open the valves 16 and 18 for raising the top. I have found that with the shaft 100 rotating at a speed such that the arcuate actuate actuating elements 101 and 102 remain in engagement with the actuatable elements 107 and 108 for a period of ten seconds this is sufficient time to enable the power raising mechanism to function to completely raise the top.

By continuing rotation of the shaft 100 by the motor 81 after the arcuate actuating elements 101 and 102 become disengaged from their micro switches 101' and 102', the windows of the car are also operated to lift them to closed position responsively to the rain control which initiated the operation of the motor 81. For this purpose the shaft also carries a pair of arcuate actuating elements 110 and 111 which respectively control micro switches 110' and 111'. These micro switches have actuatable parts 112 and 113 respectively which are engaged by the arcuate actuating elements 110 and 111 to close respectively the circuits 114, 115 and 116, 117. The circuit 114, 115 closes the circuit 104 leading through circuit 34 to the motor circuit relay 35 and the circuit 116, 117 energizes a relay coil 118. The latter through its armature 118' closes contacts 119, 120, 121, 122 leading to the circuits 66', 67', 68' and 69' controlling the valves leading to the cylinders 38 and 48 for closing the windows. The energization of the solenoids of the valves is effected from the positive side 75 of the line through the micro switch 111' and line 117, the armature 118' and the other circuits indicated. In the particular embodiment shown the arcuate micro switch actuators 110 and 111 are not only mounted on the shaft 100 for operation in unison but are also mounted for operation in phase, and the pair of 110 and 111 actuators is staggered or offset with respect to the pair 101 and 102 so that the actuators 110 and 111 actuate the micro switches 110' and 111' respectively only after the micro switches 101' and 102' have been actuated to close the circuit for raising the top and the latter has been raised so that the motor pump 11, 12 needs only to supply sufficient power to raise the top which is first effected upon operation responsively to the rain drops and then to close the windows after the top has been raised.

The switch 93 in the circuit of the motor 81 is operated manually to close the same against the tension of a spring 125 by a push button 126 mounted in some convenient part of the body as, for example, on the instrument panel. The switch is locked in the closed position against the biasing tension of 125 by means of a latch 127 engaging a notch in the frame element of the switch, this latch 127 being pivoted at 128 to a fixed part of the frame and biased to latching position by a spring 129. The latch 127 forms an armature of a relay coil 130 whose circuit on the positive side of the line is 89 and on the ground side of the circuit is 131. The circuit 131 to the ground is normally open but is temporarily closed at a predetermined position of the shaft 100 as, for example, after the shaft has made one complete revolution by an actuating arm 132 carried by the shaft and engaging a switch element 133 and causing it to engage a fixed contact 134 connected with the ground. The temporary energization of the relay coil 130 acts on its armature 127 to release the latch and to permit the opening of the motor circuit switch 93 under the actuation of the biasing spring 125. The arrangement is such that the closure of the switch 133 and 134 is only for a short time since the moment the actuating arm 132 passes the contact arm 133 the latter is actuated by a biasing spring 135 to the open position thereby leaving the shaft 100 in the position illustrated in Fig. 2. The momentum or inertia of the motor 81 is sufficient to carry the arm 132 past the switch element 133 after the motor is de-energized at 93, thereby permitting the biasing spring 135 to open the circuit and prevent further operation of the motor.

The circuit of the motor 81 which controls the raising of the top and the closing of the windows responsively to rain energizing the rain detector circuit must be closed both at the switch 93 and at the ignition switch 94 in order to be operative. The car owner upon leaving the car with the top down and/or the windows down closes the contacts 97 by means of the ignition switch 94 and passes on the push button 126 to close the switch 93 whereupon the rain control is effective to raise the top and close the windows immediately the rain begins to fall.

Another important feature of the invention is the provision of fastening or holding means for a boot or covering for the top in its lowered position which is not only capable of firmly holding the boot or covering on the car during the normal operation thereof with the top down but is also readily releasable responsive to the initiating of the top raising operation whereby the top may be raised without hindrance of the boot or covering at any time and responsively to the rain control without the presence of the car owner to unfasten the boot or cover and with a minimum of strains being put upon the power mechanism utilized in the top raising operation.

Referring more particularly to Figs. 1, 1A, 3, 4, 4A, 4B, and 4C, 4D of the drawings, I have illustrated a boot or covering of somewhat conventional shape or form designated generally by the numeral 140. The top is stored in a back recess 141 formed adjacent the back 142 of the rear seat 143 and in side recesses 141' forming continuations of the back recess portion 141, it being understood that the top is collapsed during the lowering and storing operation so as to occupy this recess 141. The boot or cover in this embodiment is provided with a main top covering part 144 which extends all the way across the car body and covers the back recess 141. There are two forwardly extending side portions 145 which extend past the back 142 of the car seat and are provided with downwardly extending fastening flaps 145' having any suitable fastening means 146 such, for example, as snap fasteners. Preferably other fastening means are provided at the forward edge of the main body portion 144 which means comprise in the particular embodiment shown, three metallic strips 147 riveted at their upper ends 147' to the cover portion 144 and fastened to the back of the seat by any suitable fastening means 148 as, for example, snap fasteners, or as shown in the drawings strap holders through which the strips freely slide, with the holders fastened to the back, as indicated at 148'.

The rear edge or periphery of the boot or cover 140 is provided with means for holding the same firmly against the car body during normal operation of the car when the top is in the down or lowered position but of a character which is readily releasable by the movement of the top the moment it beings to emerge from the recess 141 responsively to the rain control. I have found particularly suitable for this purpose magnetic holders 150 which though firmly holding the rear of the boot or convering down on the car to prevent flapping and to present a neat appearance during normal operation of the car with the top down, yet are readily releasable to permit the boot or covering to be folded or moved over forwardly by the top as it emerges from the recess and with no substantial hindrance or resistance to the power operating mechanism. In the particular embodiment shown this magnetic holding means comprises miniature permanent magnets suitably fastened to the underside of the rear of the boot or convering which are firmly held by the magnetizable portion 151 of the car frame. As illustrated in the particular embodiment shown (Fig. 4) the rear edge of the top covering 4 is held in position on the car frame by the magnetizable frame portion 151. Preferably the magnets 150 are of curved cross section (Fig. 4D) to conform to the similarly curved outer surface of the magnetizable element or portion 151 of the car body. The poles of the magnets 150 may extend either forwardly or laterally of the body, but in the particular embodiment shown extend laterally with the under sides curved convex.

In Fig. 1A the boot or cover 140 is shown as it is being moved out of the path of the emerging top after the magnetic holding means 150, 151 have been disengaged by the upward movement of the top.

In the conventional practice the side edges of the top in its up or raised position are fastened by fastening means which must be manually manipulatable for release for lowering the top and for fastening after the top is raised. These fastening means usually comprise one of the various forms of snap fasteners and the manual fastening is usually a tedious operation and is often inconvenient as, for example, when the top is power lifted while the car is travelling and likewise the manual unfastening is inconvenient when it is desired to lower the top by the power operating means while the car is travelling. The conventional means which require manual fastening would be particularly unsatisfactory where the top is power raised responsively to the rain when the owner or operator of the car is not present.

Figure 5:
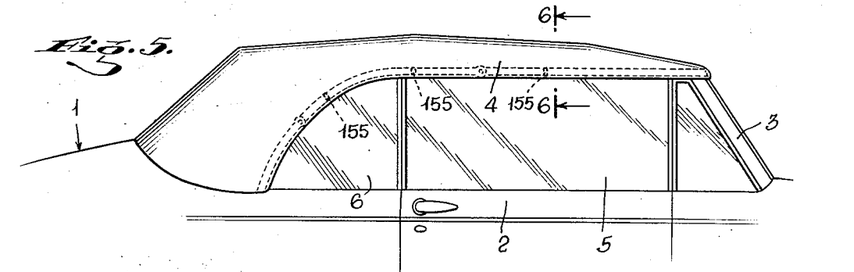
Fig. 5 is a perspective view of the top of an automobile embodying the invention.
Figure 6:
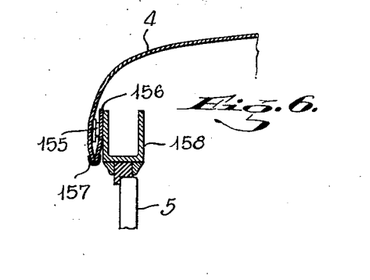
Fig. 6 is a sectional view along the line 6—6 of Fig. 4.

I have provided a simple fastening means which functions to firmly hold the edges of the top down and against flapping during normal operation of the car and at the same time are readily releasable when the top is lowered by the mere act of lowering the top and which are re-engaged by the mere act of raising the top to the up position. These fastening means for one side are indicated in Fig. 5 at 155 and in the embodiment shown comprise magnetic fastening devices. Still further in the particular embodiment shown these comprise permanent magnets 155 fastened to the inner side of a border strip 156 which is in turn fastened at its lower edge 157 to the lower edge of the top cover. These permanent magnets 155 are attracted toward the magnetizable top frame member or members 158 to hold the border 156 tightly thereagainst during normal car operation but to readily release the same when the top is collapsed during the lowering operation. When the top is raised, as for example responsively to the rain control, the frame members 158 tend to attract the magnets and thereby hold the border edge of the top cover firmly thereagainst usually without the necessity of manual manipulation.

The release of the boot magnetic fastening and holding means 150, 151 upon initial movement of the top in the raising operation, and the release of the magnetic fastening means 155 for the edges of the top cover 4 during the lowering movement of the top and the refastening of the magnetic fastening means 155 by the mere act of raising the top, are facilitated by the top frame structure and mechanism illustrated schematically in Fig. 1B.

The top cover is shown at 4 in dot and dash lines. One of the cylinders 10 is illustrated with its pull and push piston rod 300. This piston rod 300 is attached to a lever member 301 which in turn is pivotally fastened at a fixed point Y of the frame. The piston rod 300 is also pivotally fastened to a link 302, the latter being pivotally fastened at 303 to a main top side frame member 304. This main frame member 304 is fulcrumed at a fixed point X of the automobile body frame. This main frame member 304 embodies a lefthand part 305 and a righthand portion 306 all of which is one rigid member. The portion 306 is pivotally fastened at 307 to side frame member 308 and the latter is pivotally fastened at 309 to a lever 310 fulcrumed at a fixed point Z of the frame. The side frame member 308 stops at 311 and in the raised position 308 is in substantial alinement with a forward side frame member 312. These two members 308 and 312 are fulcrumed off center at 313 by bracket members 314 secured thereto. The side frame members 308 and 312 are also fastened together by a pair of links 315 and 316 which pair of links is in turn pivotally fastened to a link 317, the latter being pivotally connected at 318 to the righthand portion 306 of frame member 304. When the cylinder 10 begins to pull on the piston rod 300 this results in an initial upward movement of the righthand end of the frame member 312. A pair of links also connects the side frame member 312 with the link 317, these links being an elongated link 320 pivotally fastened at its righthand end 321 to the side frame member 312 and pivotally fastened at its lefthand end at 322 to another but shorter link 323, the latter being pivotally connected at 324 with the link 317. The bows for giving form to the top are indicated at 325, 326, 327 and 328. The bow 325 is fastened to one end of a lever 330 which in turn is pivotally fastened at 331 to the lefthand portion 305 of the frame member 304. The bow 326 may be supported and fastened in any suitable manner to the side frame member 304, the details being omitted for convenience in illustration. The bow 327 is fastened to the righthand end of the link 323. The forward bow member 328 is fastened in any suitable manner to the wind shield frame 332. Since the last movement of the bow member 328 in the raising operation and the initial movement in the lowering operation is substantially vertical with respect to the frame 332 any suitable means may be provided for holding the bow member 328 and the top frame in the raised position, as by providing a dowel pin lock which may be released by upward movement of the bow member 328 and may be engaged by the downward movement thereof. The raising of the top responsively to the rain control mechanism and locking it in the raised position is facilitated and likewise the initial movement of the lowering of the top is facilitated by said dowel lockng means which is shown schematically at 335. It is understood that the top framing shown in Fig. 1B is duplicated on the opposite side.

In the embodiment of Figs. 12, 13, 14 and 15, the power cylinders for operating the top, namely for both raising and lowering the top are indicated by the numeral 10 and power mechanism for closing and lowering the windows may be the same as illustrated in Fig. 2. The motor hydraulic pump assembly is indicated at 11, 12, 13 similarly to the embodiment of Fig. 2 and it is understood that the means 65 illustrated schematically in Fig. 2 may be utilized for individually and separately operating the windows. The hydraulic pressure line from the pump or compressor 11 is indicated at 160 and the return line is indicated at 161. A single valve unit 162 is provided for controlling the fluid pressure supply to and from the power cylinders 10. This unit comprises a cylinder 163 and fluid lines 164 and 165 leading respectively to the lower ends and the upper ends of the cylinders 10 for raising and lowering the top. The pressure side of the pump 11 is connected through the line 160 with the cylinder 163 at a point intermediate the connection of the line 164 and 165 with the cylinder while the return fluid line 161 of the pump and the system is in communication with the cylinder 163 both at the upper portion thereof and at the lower portion. A piston valve 166 is disposed in the cylinder 163 which has pistons 167 and 168 spaced from each other so as to simultaneously cover the ports of the lines 164 and 165 when the piston valve 166 is in the neutral or intermediate position. When it is in this neutral or intermediate position the fluid lines 164 and 165 are in communication with each other through passages in the pistons 167 and 168 and a connecting passage therebetween designated 169. In this position both the upper ends and the lower ends of the power cylinders 10 are connected together.

For raising the top the lower ends of the cylinders 10 are connected with the annular chamber between the pistons 167 and 168 and the fluid pressure through the line 160 is supplied to this chamber and thence to the cylinders 10 to raise the top. Simultaneously the line 165 connected to the upper ends of the cylinders is connected with the lower end of the cylinder 163 which is in communication with the intake side of the pump, thereby providing return of the fluid. To accomplish this the piston valve 166 is actuated upwardly to uncover the ports of the lines 164 and 165. When it is desired to lower the top the piston 166 is moved downwardly from the neutral position to uncover the ports of the lines 164 and 165 and fluid pressure then is supplied through the line 165 to the upper ends of the cylinders 10 and exhausted from the lower ends thereof to lower the top. The piston 166 is held in the position shown in full lines in Fig. 12 when the top is either up or down as, for example, by means comprising springs 170 disposed below and above the valve which are designed to bias the valve toward its intermediate position. Solenoids 174 and 175 are provided for operating the valve from its intermediate position and in the particular embodiment shown an armature core 171 is common to both solenoids. The piston is actuated from this intermediate position by solenoids 174 and 175, the solenoid 174 moving the piston 166 in an upward direction through the stem 166' and the core 171 and the solenoid 175 moving the piston downwardly from the intermediate position through the same medium. The solenoids 174 and 175 are controlled by switch contacts 176 and 177, these contacts 176 and 177 being connected through the lines 176' and 177' with the solenoids, one side of the solenoids being grounded as indicated. A switch member 178 is movable in one direction to control the contact 176 and in the other direction to control the contact 177 and the positive side of the line 29 is connected with the switch member 178. Simultaneously with the operation of the switch element 178 in either direction the circuit 34 to the solenoid 35 is closed at the contacts 180 so that upon actuating the switch 178 in either direction the motor 12 is energized to operate the pump 11 and thereby to supply the hydraulic fluid pressure to the cylinders 10 to operate the top in the desired direction.

Similarly to the embodiment of Fig. 2 the rain detector switch 83 is provided in the circuit 82 of the sensitive relay coil 80, the other side of this coil being connected through the line 75 with the positive side of the source of energy 28. A movable armature 182 controls a contact 88 in the circuit of the ignition switch 94, a line conductor 183, switch 184 and line 185 to the motor 81, the other side of the motor being grounded as indicated. As described above with respect to the embodiment of Fig. 2, the ignition switch breaks the motor circuit at the contacts 97 when the ignition circuit is closed. When the control is set for rain control the switch 184 is closed to line 185 and upon the completion of the rain detector circuit through the solenoid 80 the armature 182 is operated against the tension of a spring 186 to close the motor circuit at the contact 88. The motor 81 is geared down to the shaft 100' to drive it at the required speed and when the motor 81 is energized the rotation of the shaft 100' is initiated. It carries an arcuate actuator 188 and this actuator engages a switch element 189 to close two circuits, one circuit 190 to the solenoid 174 and the other circuit 191 to the motor circuit relay 35 through the line conductor 34. The switch element 189 is connected with the positive line 29 through a line conductor 192 and accordingly as long as the arcuate actuator 188 is in engagement with the switch element 189 the solenoid 174 is energized to maintain fluid pressure in the lower ends of the cylinders 10 and the circuit of the motor 12 is maintained closed at the contacts 17. I have found that the ten-second period for maintaining these circuits is sufficient to raise the top.

The shaft 100' also carries an arcuate actuator 194 which is mounted on the shaft to come into action immediately after the actuator 188 disengages the switch element 189. The arcuate actuator 194 engages a switch element 195 which in turn closes five contacts 196, 197, 198, 199 and 200. The contacts 196 to 199 are in the circuits respectively 66', 67', 68' and 69' leading to the solenoids of the electromagnetic valves controlling the cylinders 38 and 48 illustrated in Fig. 2. The contact 200 is in a line 201 which connects with the line conductor 191 leading to the relay coil 35 which controls the motor 12 circuit. The switch element 195 is electrically connected with the line 192 which in turn is energized by the positive side 29 of the source of energy. Upon the openings of the valves of the cylinders 38 and 48 and the energization of the motor 12 the windows are operated against the tension of the biasing springs shown in Fig. 2. The dwell on the actuator 194, namely the period the latter maintains the switch 195 closed, depends on the speed of the shaft 100' and the arcuate lengths of the actuator, and I have found that a period of seven seconds is sufficient to allow for closure of all the windows.

The shaft 100' carries a contact actuating arm 202 and just short of one complete revolution of the shaft the arm 202 engages the switch element 184 to de-energize the line 185 and to stop the motor 81. The latter stays in this position until the rain water has dried out or been removed from the rain detector switch 83 whereupon the solenoid 80 is de-energized and permits the spring 186 to actuate switch element 182 and close circuit 204 at contact 205. The switch element 184 is now in contact with contact 204' of circuit 204 and motor 81 is energized through line 75, 182—205, 204, 184 and motor control line 185. During the stoppage of the motor 81 while the water is being removed from the switch element 83 the arm 202 remains in engagement with the element 184 to hold the circuit 183 open and circuit 204 closed at 204'. The motor starts upon closure of circuit 204 at 182, 205 and continues to operate long enough to cause arm 202 to disengage switch element 184 and permit it to again close circuit 183 and open the circuit 204 at 204' ready for the next rain control operation. The motor is now arrested in the position shown in Fig. 12. The arrangement is such that the motor stops before the arm 202 disengages the switch element 184 upon the initial engagement thereof, and the motor is restarted by the removal of the water from the rain switch 83, the arm 202 disengages the switch element 184 to permit reclosure of the motor control circuit 183 at the switch element 184 but the motor control circuit is now open at the contact 88.

Figures 7A, 16:
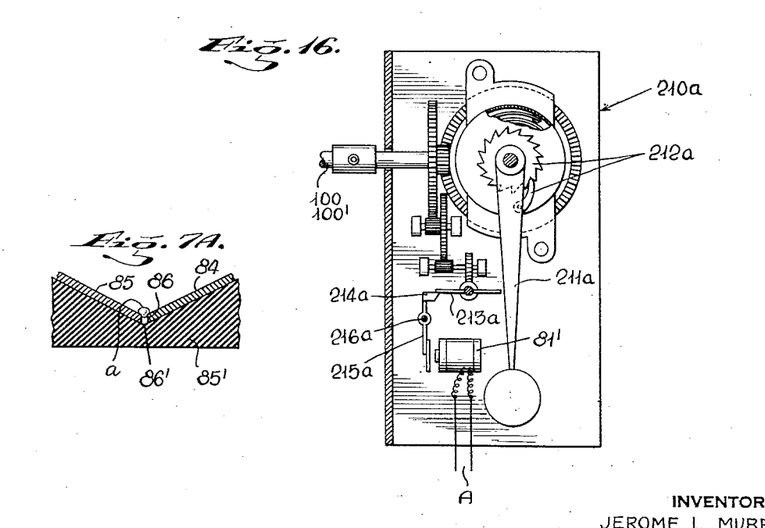
Fig. 7A is an enlarged sectional view of a part thereof.
Fig. 16 is a schematic illustration of a spring motor which may be used in the embodiments of Figs. 2 and 12.

In the embodiment of Fig. 16 I have illustrated a spring motor 210a for operating the shafts 100 and 100', that is this spring motor takes the place of the electric motor 81 indicated in the above embodiments. Its operation is controlled by a solenoid 81' for starting and stopping the spring motor. Assuming, for example, that the spring motor 210a is to take the place of the electric motor 81 in the embodiment of Fig. 2, the control circuit A for the solenoid 81' would be the lines 91 and 92 and assuming that this motor is to take the place of the motor 81 in the embodiment of Fig. 12, this circuit becomes the lines 185 and the ground connection in Fig. 12. The spring motor may be of any conventional type and it is understood that when the solenoid 81' is energized the spring motor is released to drive the shaft 100 or 100' at a slow rate of speed and preferably at a constant speed. In the particular embodiment shown the spring motor 210a is provided with a pendulum 211a mounted for movement in the line of travel and coupled up to the spring motor in a manner to utilize the inertia effects of the car operation to wind the spring motor and keep it wound. In the schematic illustration the pendulum 211a actuates a pawl and ratchet mechanism 212a to wind and energize the motor. A fly or governor member 213a may be arrested or released by a control member 214a which is adapted to be moved into and out of the path of the governor 213a by the electromagnet 81'. The means schematically shown comprises a member 215a carrying the stop member 214a and pivotally mounted on pin 216a and it is understood that the armature of the electromagnet 81' is either carried by member 215a or is operatively attached to it.

Figures 17, 18, 19:
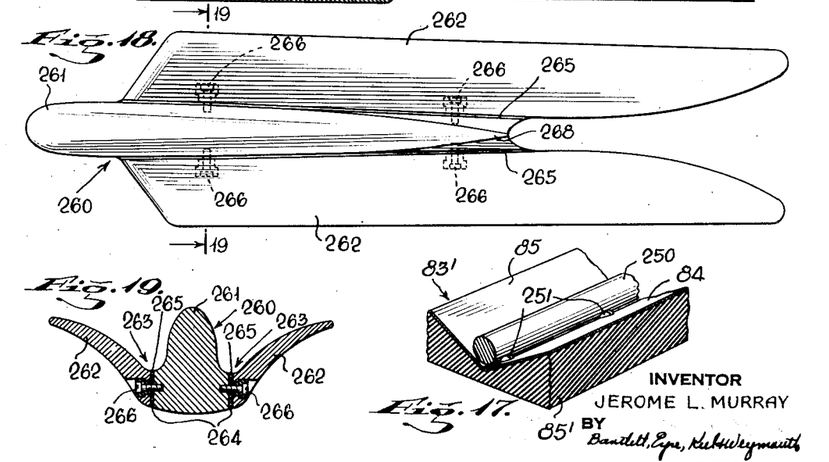
Fig. 17 is a view of another embodiment of a rain control switch embodying the invention.
Fig. 18 is a plan view of another embodiment of a rain control switch embodying the invention.
Fig. 19 is a sectional view along the line 19 of Fig. 18.

In the embodiment of Fig. 17 the detector switch 83' is responsive to snow as well as rain to quickly raise the top and close the windows. The detector switch 83' is generally similar to the switch 83 described above but it is provided with a metal or plastic strip 250 which is attached to the inclined metallic insulated plates 84, 85 so as to be elevated above the plates and is of a character to quickly melt the snow flakes as they fall to form water which immediatly runs down to close the detector circuit and raise the top and close the windows in accordance with either of the embodiments shown above. I have illustrated this strip 250 as having a circular cross section but it may be of any suitable shape and I have illustrated at 251 lugs for supporting the strip 250 sufficiently above the plates 84 and 85 to permit the water readily to run thereunder to close the circuit at the spaced lower edges of the insulated plates. This strip 250 may be of any suitable character for the purpose but the preferred structure is a chemically impregnated metal or plastic strip as, for example, impregnated with a salt solution or any chemicals that will melt snow, hail or ice. Preferably a non-corrosive chemical is employed for the impregnation. With this arrangement the first few flakes of snow or sleet are converted into water drops as they fall upon the metal strip 250 to close the detector circuit as described above.

In the embodiment of Figs. 18 and 19 I have illustrated my rain detector switch as embodied in an automobile ornament 260 comprising a figure 261 and wings 262. In this embodiment of the invention the rain detector switch is indicated at 263 formed in the hollow between a wing 262 and figure 261, there being two of these detector switches, one on either side of the figure 261 and formed between 261 and the corresponding wings 262. The figure 261 and the wings 262 are either of metal or provided with conductive edges at the detector switches 263, but the figure 261 is insulated from the wings 262 by means of an insulation 264 leaving a small gap 265 corresponding to the spacing of the plates 84 and 85 of the embodiment above described whereby rain drops complete the detector circuit between one or the other of the wings 262 and the figure 261. In the particular embodiment shown the figure 261 is tapped on its lower side edges for the reception of an attaching screw and insulated attaching screws 266 pass through openings formed in the lower parts of the wings 262 and are screw-threadedly attached to the tapped recesses of the central figure 261. The rain drops close the detector circuit with this embodiment as described above with respect to the embodiment of the rain control switch 83 to raise the top and close the windows. The upper part of the central figure 261 is of streamlined form tapering to a point 268 at the rear and in the particular embodiment shown the lower part of the body of the figure 261 tapers in width slightly toward the rear so that the rain detector switches 263 also slightly converge at their rear ends. The sweep of the air therepast however functions as described above with respect to the rain detector switch 83 to sweep the water or rain drops out of the gaps 265 the moment the rain stops and the car begins to move.

In the embodiment of Fig. 20 the control circuit 91 of the motor 81 shown in Fig. 2 leads through a relay switch 270 having a solenoid 271 disposed in the ignition circuit. When the ignition switch is open the relay switch 270 is closed by a spring 272 but when the conventional ignition switch 94' is closed, the solenoid 271 is energized to break the circuit 91. By this arrangement the rain control of the top and the windows is inoperative when the car or engine is running or when the ignition circuit is closed.

The rain switch 83, or the rain, snow and sleet switch 83' or the rain switches 263 embodied in the hood ornamental figure 261 are of a character as indicated to be inconspicuously incorporated in the automobile, on the hood of the automobile as indicated above. The control units embodying the electric motor 81 or the mechanical motor 210 are formed of miniature dimensions capable of being readily installed within the hood or within any other convenient location within the car body. The units are so small as indicated as to be readily adapted to mounting within the most compact spaces.

Figure 10:
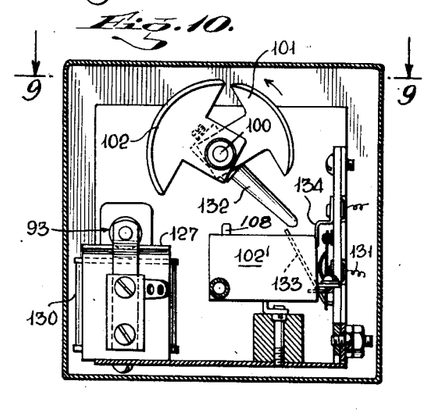
Fig. 10 is a section along the line 10—10 of Fig. 9.
Figure 11:
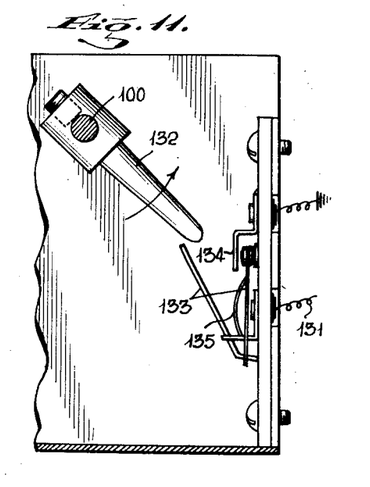
Fig. 11 is a sectional view along the line 11—11 of Fig. 9.

The unit shown in Figs. 9, 10, and 11 embodies a casing 350 and the motor 81 is fastened to one end thereof. The switch element 133 is normally biased to open the ground circuit at contact 134 and the actuating arm 132 which momentarily closes the circuit at 134 against the bias is driven by the inertia of the motor drive mechanism past the projecting arm 133 of the switch. Accordingly the circuit of the solenoid 130 is immediately broken at the contact 134, remaining closed just long enough to drop the armature 127 and permit the push button 126 to be withdrawn by the spring 125 to break the motor control circuit at the contact 93. In the unit shown in Figs. 9 to 11 the end of the armature 127 is biased by the spring 129 to engage a collar 261 and thereby hold the push button 126 in the set position wherein the motor control circuit 92 is ready for the closure of the circuit at the contact 88 by the rain detector circuit. The solenoid 130 upon energization actuates the armature 127 to disengage the collar 261 and thereby permit the opening of the circuit at that point.

Figures 13, 14, 15:
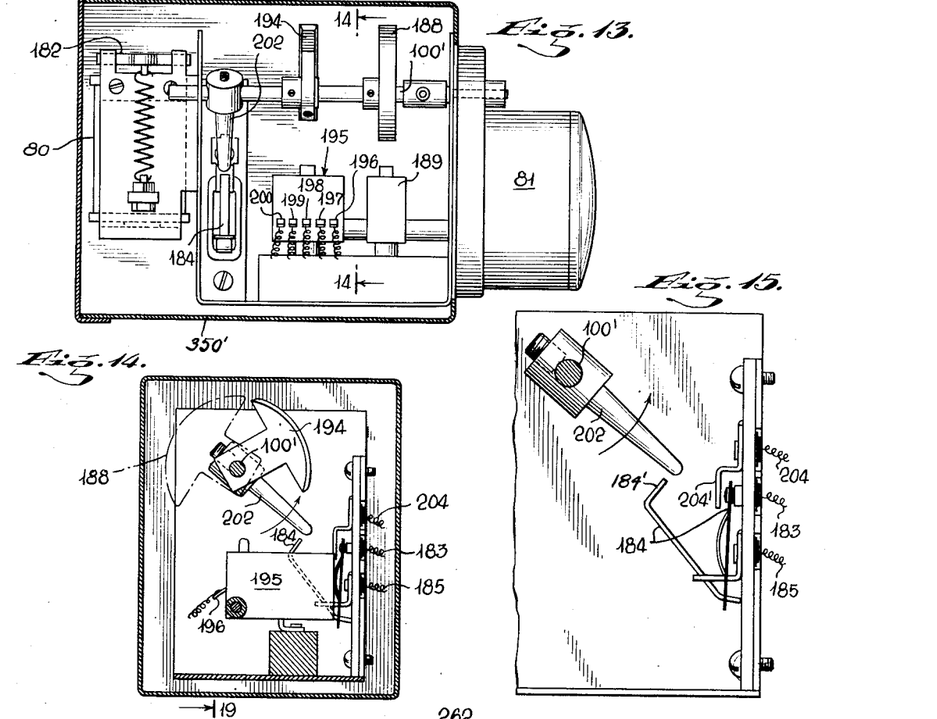
Figs. 13, 14 and 15 are schematic illustrations of a control unit utilized in the embodiment of Fig. 12.

The embodiment of Figs. 13, 14 and 15, corresponding to the embodiment of Fig. 12, is a simpler arrangement than that described above. The unit embodies a casing 350' and may be formed into an even more compact and smaller unit than that of Figs. 9, 10 and 11. The switch element 184 is spring biased to close the circuit at 183 and 185. The actuating arm of the switch element 184 is provided with an angular end 184' which enables the motor to stop before the arm 202 disengages the arm upon the initial engagement thereof, thereby as described above temporarily closing the circuit at 204' for restarting the motor when the water is cleared from the detector switch. The restarting of the motor results in the arm 202 disengaging the arm of the switch element 184 to permit the re-closure of the circuit at 183, 185 and the opening of the circuit at 204'. This embodiment is characterized particularly by its simplicity in the minimizing of the parts as, for example, there being only two arcuate switch actuating elements and two switches to be actuated by the motor to operate the top and windows and a single switch for controlling the motor 81 at the end of its cycle of operations.

The rain, snow and sleet controls for operating the top and the windows are characterized by their simplicity in structure and operation and by their sensitivity to the first few rain drops or first snow flakes and sleet. The rain, snow and sleet detector switches are characterized also by their simplicity in construction and by the self water cleaning function effected by the sweep of the air.

The controls for directly controlling the operation of the power mechanisms for the top and the windows are characterized by their simplicity and by their certainty in operation. The boot and top cover fastening means are characterized by their simplicity, by the requirement of a minimum of hand manipulation, by a minimum of hindrance upon the operation of the power mechanisms and by the manipulation of the fastening means by the operations of raising and lowering the top.

I claim:

1. In an automobile having a raisable top and power means for raising the same, together with a cover for said top in the lowered position, the combination of a rain control for causing said power means to raise the top, said cover being detachably fastened at a portion thereof by a means which firmly holds the cover in position during normal operation but is readily releasable by the initial movement of the top in the raising operation, said releasable holding means comprising permanent magnets spaced about the portion of the cover having the readily releasable means and normally disposed in engagement with a magnetizable portion of the automobile body.

2. A control for power operating means for the top and windows of an automobile, comprising a frame, a shaft journalled therein, a motor adapted to drive said shaft, a relay responsive to precipitation for initiating the operation of the motor, control means for the power operating means actuated by the shaft and held in the actuated position during a predetermined angular movement of the shaft, and means responsive to shaft movement for temporarily arresting the operation of the motor after said predetermined angular movement and setting up another control for starting the motor effective when the relay responsive to precipitation is deenergized, said last named control being neutralized upon the restarting of the motor to arrest the motor at its initial starting position.

3. In an automobile having a raisable top and power means for raising the same, together with a cover for said top in the lowered position, the combination of a rain control for causing said power means to raise the top, said cover being detachably fastened at a portion thereof by a means which firmly holds the cover in position during normal operation but is readily releasable by the initial movement of the top in the raising operation.

References Cited in the file of this patent

UNITED STATES PATENTS

| | | |
|---|---|---|
| 1,147,559 | Sherman | July 20, 1915 |
| 1,198,227 | Hinchey | Sept. 12, 1916 |
| 1,262,391 | Sabol | Apr. 9, 1918 |
| 1,280,116 | Troaino | Sept. 24, 1918 |
| 1,326,877 | Rebours | Dec. 30, 1919 |
| 1,448,981 | Summerscales | Mar. 20, 1923 |
| 1,554,674 | Herod | Sept. 22, 1925 |
| 1,809,505 | Campbell | June 9, 1931 |
| 1,810,870 | Carlson et al. | June 16, 1931 |
| 2,007,873 | Paulin | July 9, 1935 |
| 2,105,293 | Paulin | Jan. 11, 1938 |
| 2,166,481 | Baird | July 18, 1939 |
| 1,171,329 | Boone | Aug. 29, 1939 |
| 2,185,581 | Bessonneau | Jan. 2, 1940 |
| 2,185,646 | Noland et al. | Jan. 2, 1940 |
| 2,191,269 | Atwater | Feb. 20, 1940 |
| 2,198,488 | Smith | Apr. 23, 1940 |
| 2,248,379 | Parsons | July 8, 1941 |
| 2,259,264 | Parsons | Oct. 14, 1941 |
| 2,276,511 | Parsons | Mar. 17, 1942 |
| 2,289,173 | Best | July 7, 1942 |
| 2,319,292 | Boggs | May 18, 1943 |
| 2,372,685 | Schaich | Apr. 3, 1945 |
| 2,389,298 | Ellis | Nov. 20, 1945 |
| 2,397,931 | Ellis | Apr. 9, 1946 |
| 2,405,044 | Montalvo | July 30, 1946 |
| 2,414,653 | Lockholder | Jan. 21, 1947 |
| 2,438,545 | Davidson | Mar. 30, 1948 |
| 2,443,687 | Marquard | June 22, 1948 |
| 2,457,421 | Warren | Dec. 28, 1948 |
| 2,490,040 | Frerer | Dec. 6, 1949 |

FOREIGN PATENTS

| | | |
|---|---|---|
| 415,548 | Great Britain | Aug. 30, 1934 |
| 479,444 | Great Britain | Feb. 7, 1938 |
| 544,110 | Great Britain | Mar. 27, 1942 |

OTHER REFERENCES

Chilton Motor Age, pages 84, 85, 172, 174, 176, 177, January 1952.